United States Patent
Daiku

(10) Patent No.: US 10,901,138 B2
(45) Date of Patent: Jan. 26, 2021

(54) LIGHT SOURCE DEVICE AND DISPLAY APPARATUS PROVIDED THEREWITH

(71) Applicant: TOPPAN PRINTING CO., LTD., Tokyo (JP)

(72) Inventor: Yasuhiro Daiku, Hino (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/214,700

(22) Filed: Dec. 10, 2018

(65) Prior Publication Data

US 2019/0107664 A1    Apr. 11, 2019

Related U.S. Application Data

(63) Continuation of application No. PCT/JP2017/024035, filed on Jun. 29, 2017.

(30) Foreign Application Priority Data

Jul. 28, 2016    (JP) ................................. 2016-148620

(51) Int. Cl.
*F21V 8/00* (2006.01)
*G02F 1/1335* (2006.01)
(Continued)

(52) U.S. Cl.
CPC .......... *G02B 6/0056* (2013.01); *G02B 6/003* (2013.01); *G02B 6/0025* (2013.01);
(Continued)

(58) Field of Classification Search
CPC .... G02B 6/0056; G02B 6/0025; G02B 6/003; G02B 6/0031; G02B 6/0066;
(Continued)

(56) References Cited

U.S. PATENT DOCUMENTS

2010/0045894 A1    2/2010    Itoh et al.
2010/0195022 A1    8/2010    Shikii et al.
(Continued)

FOREIGN PATENT DOCUMENTS

| CN | 101395425 | 3/2009 |
| CN | 101523110 | 9/2009 |

(Continued)

OTHER PUBLICATIONS

English Translation by WIPO of the International Preliminary Report on Patentability dated Feb. 7, 2019 in corresponding International Patent Application No. PCT/JP2017/024035 (11 pages).
(Continued)

*Primary Examiner* — Nathanael R Briggs

(57) ABSTRACT

A light source device supplies a laser light to a display panel. The light source device includes: a light-emitting element configured to emit a laser light; and a light guide plate with a stepped bottom portion, the light guide plate disposed to receive the laser light from the light-emitting element at a side portion. The bottom portion of the light guide plate includes a plurality of reflecting surfaces arranged side by side in a first direction in which the laser light travels.

9 Claims, 8 Drawing Sheets

(51) Int. Cl.
    *G02F 1/13357* (2006.01)
    *H01S 5/00* (2006.01)
(52) U.S. Cl.
    CPC ......... *G02B 6/0031* (2013.01); *G02B 6/0038* (2013.01); *G02B 6/0066* (2013.01); *G02F 1/133514* (2013.01); *G02F 1/133621* (2013.01); *H01S 5/005* (2013.01); *G02B 6/0046* (2013.01); *G02B 6/0055* (2013.01)
(58) Field of Classification Search
    CPC .. G02B 6/0046; G02B 6/0055; G02B 6/0038; G02F 1/133514; G02F 1/133621; H01S 5/005
    See application file for complete search history.

(56) References Cited

U.S. PATENT DOCUMENTS

| | | | | |
|---|---|---|---|---|
| 2010/0231491 | A1* | 9/2010 | Mizuuchi | G02B 6/0056 345/87 |
| 2011/0116010 | A1* | 5/2011 | Nagata | G02B 6/005 349/62 |
| 2012/0127573 | A1* | 5/2012 | Robinson | H04N 13/398 359/464 |
| 2015/0109818 | A1* | 4/2015 | Chen | G02B 6/003 362/608 |

FOREIGN PATENT DOCUMENTS

| | | |
|---|---|---|
| CN | 102037399 | 4/2011 |
| JP | 2003-215349 | 7/2003 |
| JP | 2004-319364 A | 11/2004 |
| JP | 2005-11539 | 1/2005 |
| JP | 2012-94540 | 5/2012 |
| TW | 201516533 | 5/2015 |
| WO | WO 2009/011122 A1 | 1/2009 |
| WO | WO 2010/137263 A1 | 12/2010 |

OTHER PUBLICATIONS

International Search Report dated Aug. 22, 2017 in corresponding International Application No. PCT/JP2017/024035.
Taiwanese Office Action dated Feb. 7, 2018 in corresponding Taiwanese Application No. 106125211.
Written Opinion of the International Searching Authority dated Aug. 22, 2017 in corresponding International Application No. PCT/JP2017/024035.
Notification of the First Office Action dated Apr. 28, 2020 in Chinese Patent Application No. 201780046755.7.
Final Office Action dated Sep. 29, 2020 in Japanese Patent Application No. 2016-148620.

* cited by examiner

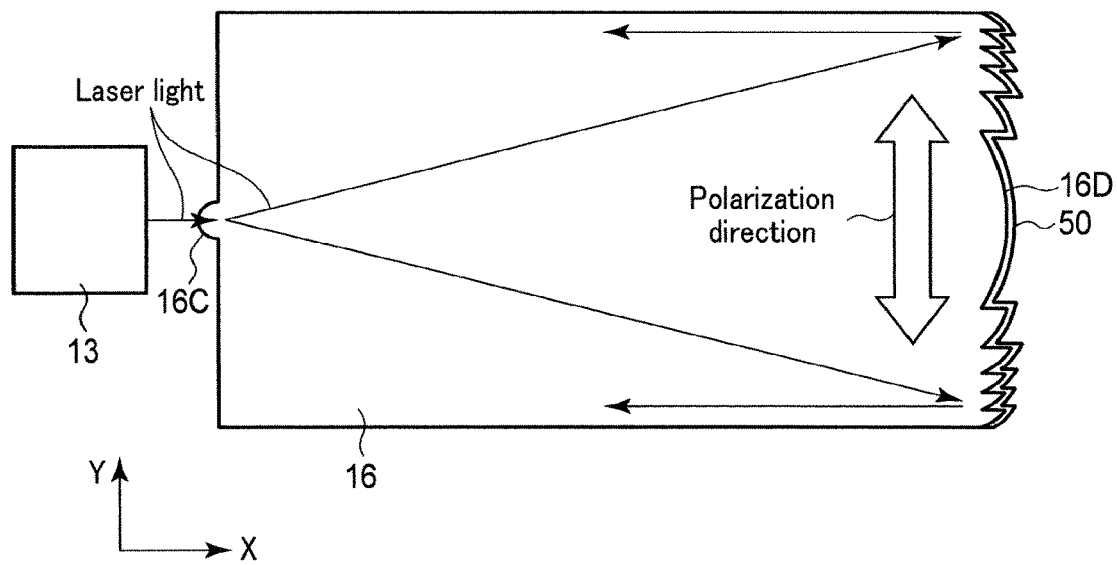
F I G. 12
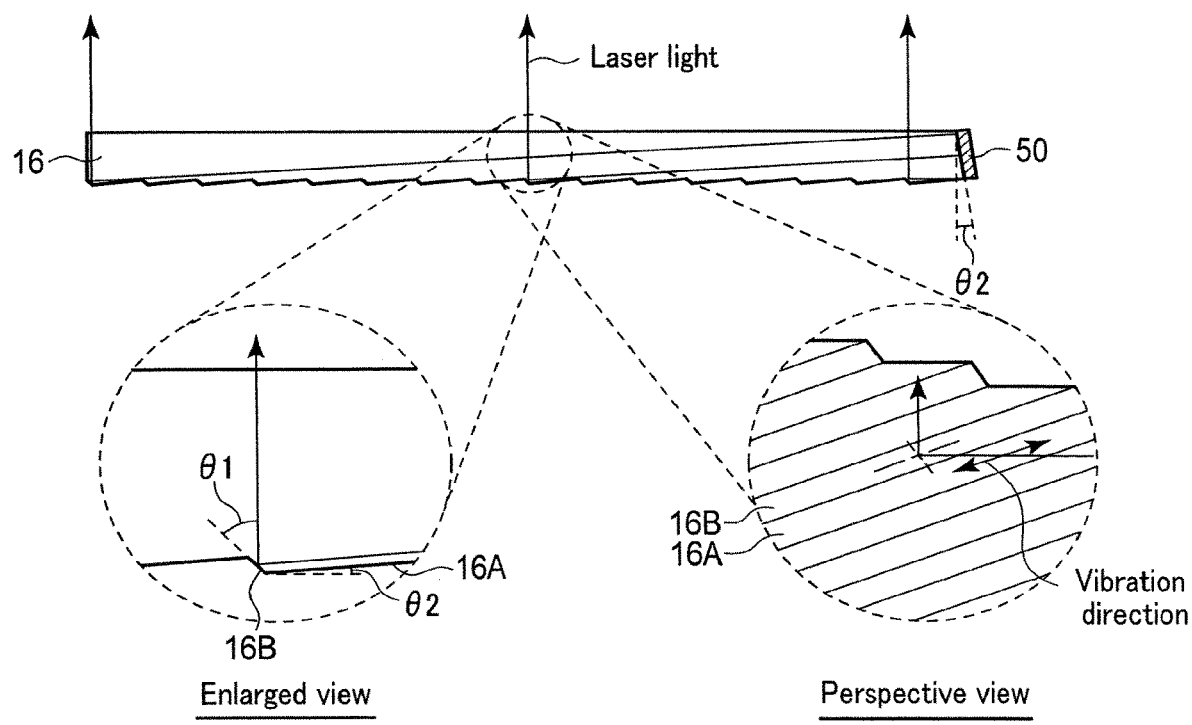
F I G. 13

LIGHT SOURCE DEVICE AND DISPLAY APPARATUS PROVIDED THEREWITH

CROSS-REFERENCE TO RELATED APPLICATIONS

This application is a Continuation Application of PCT Application No. PCT/JP2017/024035, filed Jun. 29, 2017, and based upon and claiming the benefit of priority from Japanese Patent Application No. 2016-148620, filed Jul. 28, 2016, the entire contents of all of which are incorporated herein by reference.

FIELD

The present invention relates to a light source device and a display apparatus provided therewith.

BACKGROUND

Backlights employing a white LED as a light source are known as backlights for liquid crystal display panels. LEDs tend to have lower color purity due to a width in the wavelength band. Also, since two polarizing plates are used for the liquid crystal display panel, the light intensity output from the liquid crystal display panel is not greater than half of the light intensity of the backlight.

SUMMARY

According to a first aspect of the present invention, there is provided a light source device for supplying a laser light to a display panel, the light source device comprising: a light-emitting element configured to emit a laser light; and a light guide plate with a stepped bottom portion, the light guide plate disposed to receive the laser light from the light-emitting element at a side portion. The bottom portion of the light guide plate includes a plurality of reflecting surfaces arranged side by side in a first direction in which the laser light travels.

According to a second aspect of the present invention, there is provided a light source device for supplying a laser light to a display panel, the light source device comprising: a light-emitting element configured to emit a laser light; a light guide plate disposed to receive the laser light from the light-emitting element at a first side portion, the light guide plate including a stepped bottom portion and a second side portion that is disposed on a side opposite to the first side portion and made of a Fresnel lens; and a reflecting film covering the Fresnel lens. The bottom portion of the light guide plate includes a plurality of reflecting surfaces arranged side by side in a first direction in which the laser light travels.

According to a third aspect of the present invention, there is provided a display apparatus comprising: the light source device according to the first aspect or the second aspect; and a display panel configured to modulate a laser light from the light source device.

BRIEF DESCRIPTION OF THE DRAWINGS

FIG. 12 is a plan view of a light source device according to a fourth embodiment.
FIG. 13 is a cross-sectional view of a light guide plate according to the fourth embodiment.

DETAILED DESCRIPTION

A description will now be given of the embodiments with reference to the accompanying drawings. It should be noted that the drawings are schematic or conceptual, and the dimensions and scales of the drawings are not necessarily the same as the actual products. Where the same portion is depicted in different drawings, the dimensions and scale of one drawing may be different from those of another. Several embodiments described below merely show exemplary apparatuses and methods that implement the technical ideas of the present invention. The technical ideas are not limited by the element shapes, structures, arrangements, etc. described below. In the description below, structural elements having substantially the same functions and configurations will be denoted by the same reference symbols, and a repetitive description of such elements will be given only where necessary.

[1] First Embodiment

[1-1] Overall Configuration of Liquid Crystal Display Apparatus

Figure 1:
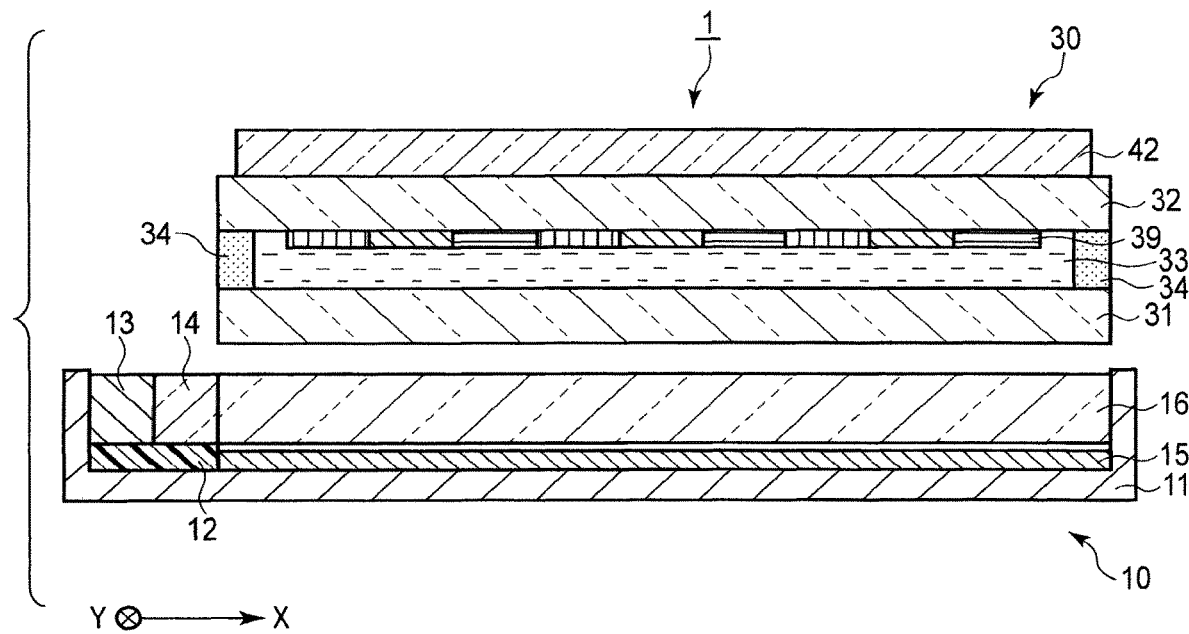
FIG. 1 is a cross-sectional view of a liquid crystal display apparatus according to a first embodiment.

FIG. 1 is a cross-sectional view of a liquid crystal display apparatus 1 according to a first embodiment. The liquid crystal display apparatus 1 includes a light source device (backlight) 10 and a liquid crystal panel (liquid crystal display panel) 30.

The light source device 10 is disposed, for example, at a predetermined interval on a back surface side of the liquid crystal panel 30, that is, on a side opposite to a display surface (a surface on which an image is displayed) of the liquid crystal panel 30. A method of fixing the light source device 10 and the liquid crystal panel 30 is discretionary, and a special supporting member, case, or the like may be used.

The light source device 10 functions as a surface light source and supplies a planar illumination light to the liquid crystal panel 30. In the present embodiment, the light source device 10 generates an illumination light using a laser light. The light source device 10 is also called a laser backlight. The light source device 10 includes a case 11, a supporting member 12, a light-emitting element (laser element) 13, an optical system 14, a reflecting sheet 15, and a light guide plate 16.

The case 11 accommodates a plurality of modules included in the light source device 10. The case 11 has a planar outer shape that is, for example, quadrangular when seen from above, and has a size and a depth capable of accommodating the plurality of modules included in the light source device 10. The case 11 is made of, for example, metal.

The supporting member 12 functions to hold the light-emitting element 13 and the optical system 14 at predetermined positions. The supporting member 12 is made of, for example, a resin. The supporting member 12 may have a complicated shape depending on the shape and position of the light-emitting element 13 and the optical system 14.

The light-emitting element 13 emits a laser light and emits a white light. For example, a semiconductor laser is used as the light-emitting element 13. The white light is generated by, for example, additive color mixing of red, green, and blue laser lights, which are the three primary colors of light. In this example, the light-emitting element 13 includes a red laser light source, a green laser light source, and a blue laser light source, and generates a white light using lights of three colors emitted by these light sources. The red laser light source emits a monochromatic light (light of a single wavelength), and this monochromatic light has high directivity. The same applies to the green laser and the blue laser.

The optical system 14 receives a laser light from the light-emitting element 13. The optical system 14 functions to convert the laser light from the light-emitting element 13 into a parallel light having a width approximately the same as a length in the Y direction of the light guide plate 16 (the direction perpendicular to the sheet of FIG. 1). FIG. 1 shows a simplified view of the optical system 14 formed by a quadrangular block, but in reality, the optical system 14 includes a plurality of lenses, as will be described later.

The reflecting sheet 15 reflects light toward the liquid crystal panel 30.

The light guide plate 16 emits the laser light incident from the optical system 14 toward the liquid crystal panel 30. The light guide plate 16 also emits a linearly polarized light in a predetermined direction toward the liquid crystal panel 30. A specific configuration of the light guide plate 16 for implementing such functions will be described later.

[1-2] Configuration of Light Source Device 10

Figure 2:
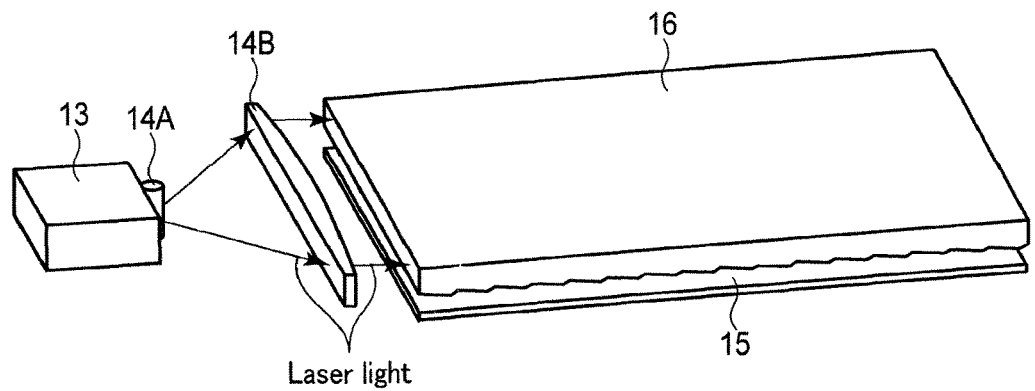
FIG. 2 is a perspective view of a light source device.
Figure 3:
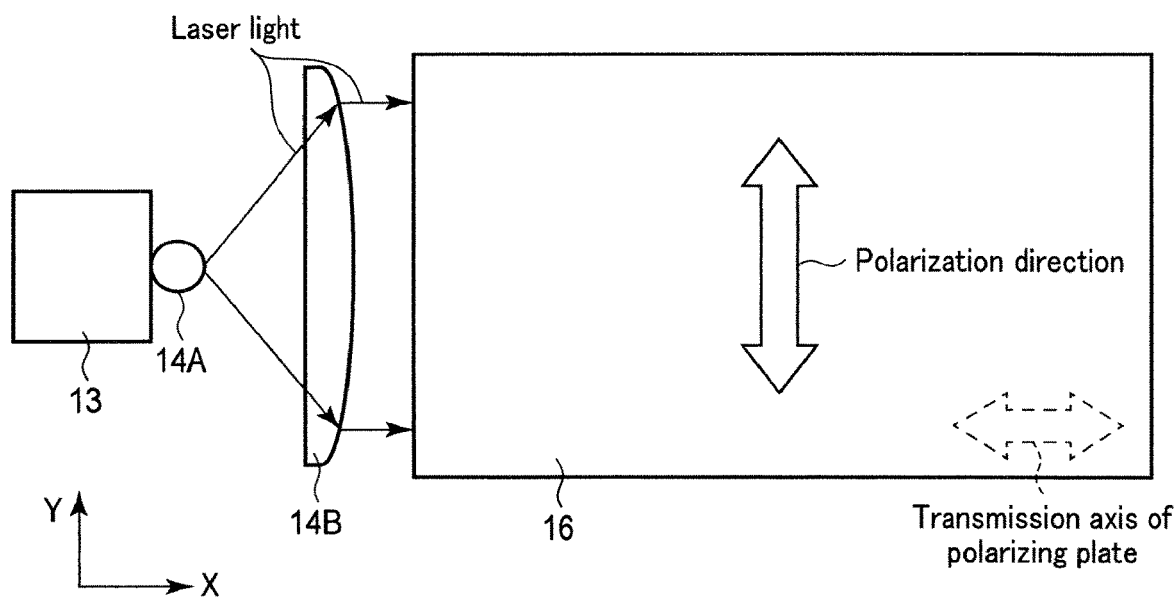
FIG. 3 is a plan view of a light source device.

Next, a specific configuration of the light source device 10 will be described. FIG. 2 is a perspective view of the light source device 10. FIG. 3 is a plan view of the light source device 10.

The optical system 14 includes a rod lens 14A and a cylindrical lens 14B. The rod lens 14A is a rod-shaped (cylindrical) lens extending in a direction perpendicular to the XY plane. The rod lens 14A is disposed on an optical path of the laser light from the light-emitting element 13, and is disposed so as to receive the laser light on its curved surface. The rod lens 14A is set to have a short focal length, and emits a laser light at a predetermined radiation angle (spread angle). The radiation angle of the laser light emitted from the rod lens 14A can be suitably set by suitably setting the diameter and the refractive index of the rod lens 14A.

The cylindrical lens 14B receives a laser light from the rod lens 14A. The cylindrical lens 14B is a planoconvex cylindrical lens having a curved surface made of a part of a cylindrical form and a linear flat surface. The cylindrical lens 14B functions to convert the laser light from the rod lens 14A into a parallel light. The width of the parallel light can be suitably set according to a distance between the rod lens 14A and the cylindrical lens 14B.

Figure 4:
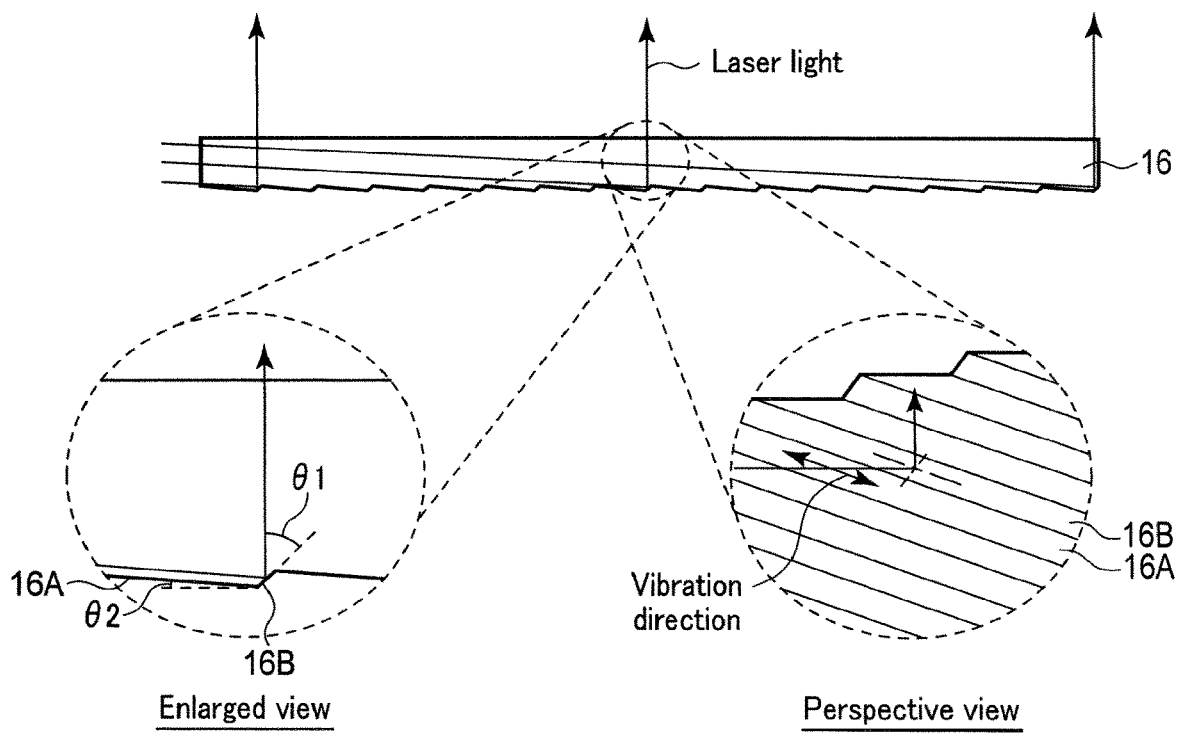
FIG. 4 is a cross-sectional view of a light guide plate.

The light guide plate 16 receives a laser light from the cylindrical lens 14B. FIG. 4 is a cross-sectional view of the light guide plate 16. FIG. 4 adds an enlarged view and a perspective view of a part of the light guide plate 16.

A bottom portion of the light guide plate 16 is formed in a staircase manner and has a plurality of steps. Each step is formed of a step surface 16A and a reflecting surface 16B that intersects the step surface 16A. A plurality of reflecting surfaces 16B are arranged side by side in the X direction, and each of the plurality of reflecting surfaces 16B extends in the Y direction. The reflecting surfaces 16B each reflect a laser light toward the liquid crystal panel 30. Each of the reflecting surfaces 16B is inclined at an angle $\theta 1$ with respect to the vertical direction. Each of the step surfaces 16A is inclined at an angle $\theta 2$ with respect to the horizontal direction.

The light-emitting element 13 emits a laser light downward at an angle $\theta 1$ with respect to the horizontal direction so that the laser light emitted from the light-emitting element 13 is approximately parallel to the step surface 16A. The supporting member 12 shown in FIG. 1 supports the light-emitting element 13 so that the light-emitting element 13 faces downward at an angle $\theta 1$. The supporting member 12 also supports the rod lens 14A so that the laser light from the light-emitting element 13 is approximately perpendicularly incident on the curved surface of the rod lens 14A, that is, the rod lens 14A is inclined downward at an angle $\theta 1$. Likewise, the supporting member 12 supports the cylindrical lens 14B so that the laser light from the rod lens 14A is perpendicularly incident on an incident surface of the cylindrical lens 14B, that is, the cylindrical lens 14B is inclined downward at an angle $\theta 1$.

[1-3] Configuration of Liquid Crystal Panel 30

Figure 5:
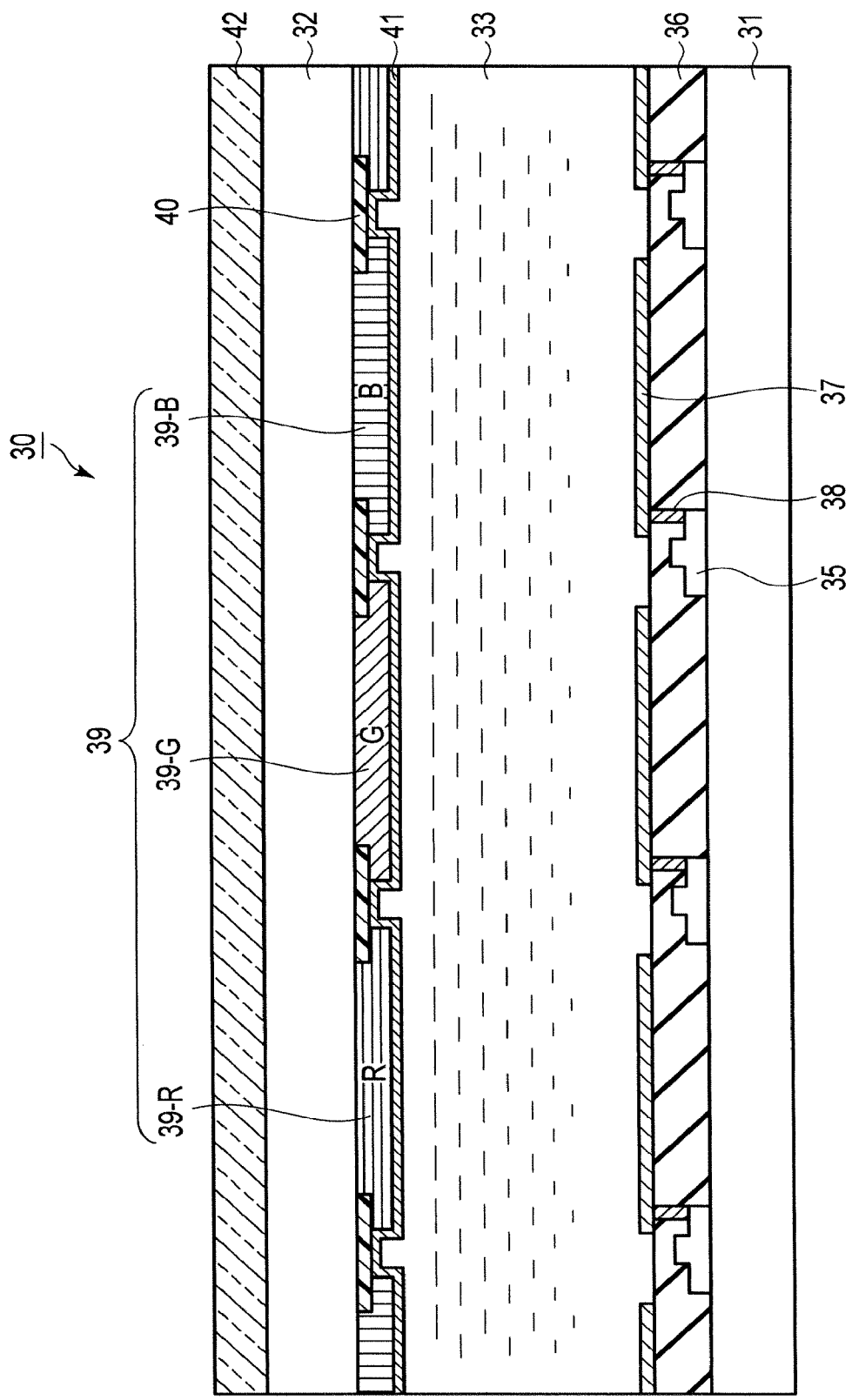
FIG. 5 is a cross-sectional view of a liquid crystal panel.

Next, an example of the configuration of the liquid crystal panel 30 will be described. FIG. 5 is a cross-sectional view of the liquid crystal panel 30.

The liquid crystal panel 30 includes: a TFT substrate 31 on which a TFT, a pixel electrode, etc., are formed; a color filter substrate (CF substrate) 32 on which a color filter, a common electrode, etc., are formed and which is opposed to the TFT substrate 31; and a liquid crystal layer 33 interposed between the TFT substrate 31 and the CF substrate 32. The TFT substrate 31 and the CF substrate 32 are each formed of a transparent substrate (such as a glass substrate). The TFT substrate 31 is, for example, disposed on the light source device 10 side, and an illumination light from the light source device 10 is incident on the liquid crystal layer 33 from the TFT substrate 31 side. Out of the two main surfaces of the liquid crystal panel 30, a main surface opposite to the light source device 10 is the display surface of the liquid crystal panel 30.

The liquid crystal layer 33 is formed of a liquid crystal material sealed by a seal member 34 that bonds the TFT substrate 31 and the CF substrate 32 together. An area surrounded by the seal member 34 is a display area of the liquid crystal panel 30. The optical characteristics of the liquid crystal material change as the orientation of liquid crystal molecules is manipulated in accordance with the electric field applied between the TFT substrate 31 and the CF substrate 32.

For example, a vertical alignment (VA) mode is used as a liquid crystal mode. However, the liquid crystal mode is not limited thereto, but various liquid crystal modes such as a twisted nematic (TN) mode and a homogeneous mode can be used. As a display mode, a normally black mode (a mode in which light transmittance or luminance in an OFF state is lower than that in an ON state) may be used, or a normally white mode (a mode in which light transmittance or luminance in an OFF state is higher than that in an ON state) may be used. The display mode can be changed by suitably setting a polarization direction by a polarizing plate and a phase difference of the liquid crystal layer.

The seal member 34 is made of, for example, an ultraviolet curable resin, a thermosetting resin, or an ultraviolet/heat curable resin, and is cured by ultraviolet irradiation, heating, or the like after being applied to the TFT substrate 31 or the CF substrate 32 in a manufacturing process. A gap material, such as glass fiber or glass beads for setting a space (i.e., a gap) between the TFT substrate and the CF substrate to a predetermined value, is dispersed in the seal member 34. In addition to or in place of mixing the gap material in the seal member 34, the gap material may be arranged in a peripheral area located around an image display area.

A plurality of switching elements (active elements) 35 are provided on the liquid crystal layer 33 side of the TFT substrate 31. As the switching element 35, for example, a thin film transistor (TFT) is used, and an n-channel TFT is used. The TFT 35 includes: a gate electrode electrically connected to a scanning line GL; a gate insulating film provided on the gate electrode; a semiconductor layer (such as an amorphous silicon layer) provided on the gate insulating film; and a source electrode and a drain electrode that are partially in contact with the semiconductor layer and are spaced apart from each other. The source electrode is electrically connected to a signal line SL.

An insulating layer 36 is provided on the TFT 35. A plurality of pixel electrodes 37 are provided on the insulating layer 36. A contact plug 38 electrically connected to the pixel electrode 37 is provided in the insulating layer 36 and on the drain electrode of the TFT 35.

A color filter 39 is provided on the liquid crystal layer 33 side of the CF substrate 32. The color filter 39 includes a plurality of colored filters (colored members), specifically, a plurality of red filters 39-R, a plurality of green filters 39-G, and a plurality of blue filters 39-B. A general color filter is formed of red (R), green (G), and blue (B), which are the three primary colors of light. A set of three adjacent colors R, G, and B forms a display unit (pixel), and a single color portion of R, G, or B in one pixel is the minimum drive unit called a subpixel. The TFT 35 and the pixel electrode 37 are provided for each subpixel. Hereinafter, a subpixel is referred to as a pixel unless a distinction between a pixel and a subpixel is particularly necessary.

A light shielding black matrix (light shielding film) 40 is provided at a boundary portion between the red filter 39-R, the green filter 39-G, and the blue filter 39-B and a boundary portion between the pixels (subpixels). Namely, the black matrix 40 is formed like a net. For example, the black matrix 40 functions to shield unnecessary light between the colored members and to improve the contrast.

A common electrode 41 is provided on the color filter 39 and the black matrix 40. The common electrode 41 is formed in a flat shape on the entire display area of the liquid crystal panel 30.

A polarizing plate (polarizer) 42 is provided on a side of the CF substrate 32 opposite to the liquid crystal layer 33. The polarizing plate 42 extracts a light having a vibration plane in one direction parallel to a transmission axis, that is, a light having a polarization state of a linearly polarized light from a light having a vibration plane in a random direction. The transmission axis of the polarizing plate 42 is set to be approximately orthogonal to a vibration direction (also referred to as a polarization direction or a polarization axis) of the laser light emitted from the light source device 10. In the present embodiment, only one polarizing plate is necessary, and no polarizing plate is provided on the TFT substrate 31 side.

The pixel electrode 37, the contact plug 38, and the common electrode 41 are formed of a transparent electrode, and are made of, for example, indium tin oxide (ITO). The insulating layer 36 is made of a transparent insulating material, such as silicon nitride (SiN).

[1-4] Operation

Next, an operation of the liquid crystal display apparatus 1 having the above-described configuration will be described.

As shown in FIG. 3, the light-emitting element 13 emits a laser light that vibrates in the horizontal direction (Y direction) and has high directivity. The laser light from the light-emitting element 13 is diffused by the rod lens 14A so as to have a predetermined radiation angle. The laser light from the rod lens 14A is converted into a parallel light by the cylindrical lens 14B. The parallel light from the cylindrical lens 14B is incident on the light guide plate 16 from its side portion (side surface).

In addition, the light-emitting element 13 and the optical system 14 (the rod lens 14A and the cylindrical lens 14B) emit a laser light downward at an angle θ1 with respect to the horizontal direction, as shown in FIG. 4. Therefore, the parallel light from the cylindrical lens 14B is incident on the side portion of the light guide plate 16 so as to travel downward at an angle θ1 with respect to the horizontal direction.

Subsequently, the laser light in the light guide plate 16 reaches the bottom portion of the light guide plate, and is reflected upward by the plurality of reflecting surfaces 16B formed at the bottom portion of the light guide plate 16. Also, since the vibration direction of the laser light in the light guide plate 16 is approximately parallel to the plurality of step surfaces 16A formed at the bottom portion of the light guide plate 16, the laser light is efficiently incident on the plurality of reflecting surfaces 16B and is reflected.

In addition, the reflecting sheet 15 is provided below the light guide plate 16, as shown in FIG. 2. Therefore, the laser light transmitted and diffused below the light guide plate 16 is reflected by the reflecting sheet 15, and is incident on the light guide plate 16 again. As a result, the usability of the laser light can be improved.

The laser light from the light source device 10 becomes a surface light source and has a polarization direction in the Y direction. The laser light from the light source device 10 is incident on the liquid crystal panel 30. The polarization direction of the laser light from the light guide plate 16 is approximately orthogonal to the transmission axis of the polarizing plate 42. Therefore, the display of normally black is realized according to the light modulation by the liquid crystal layer 33. As a result, the liquid crystal panel 30 can display a desired image.

Figure 6:
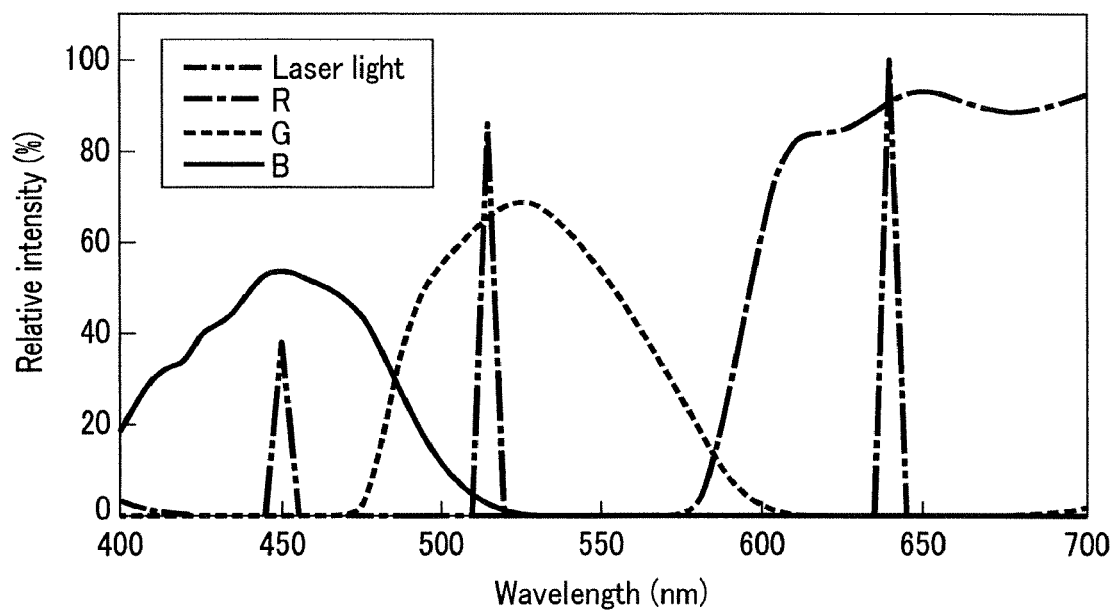
FIG. 6 is a graph illustrating characteristics of a laser light and a color filter.

FIG. 6 is a graph illustrating the characteristics of the laser light and the color filter 39. The horizontal axis of FIG. 6 represents a wavelength (nm), and the vertical axis of FIG. 6 represents a relative intensity (%). The relative intensity is an intensity for which the maximum value is set to 100%. FIG. 6 shows three types of monochromatic light included in the laser light emitted by the light-emitting element 13 and the characteristics of the red filter 39-R, the green filter 39-G, and the blue filter 39-B.

Figure 7:
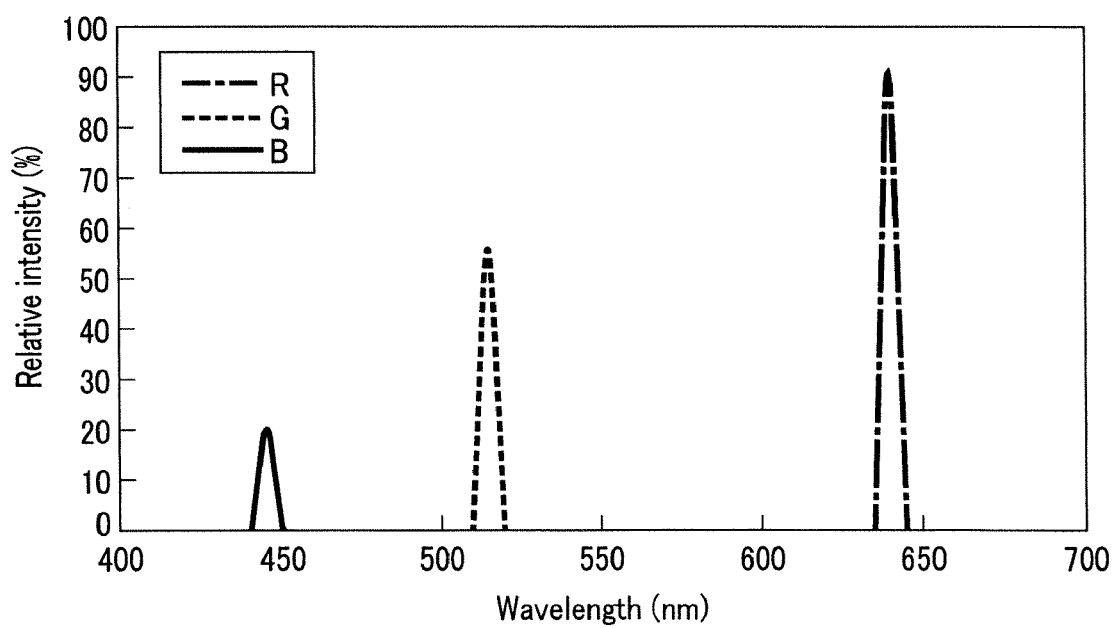
FIG. 7 is a graph illustrating characteristics of a display light after a laser light from the light source device passes through the color filter.

FIG. 7 is a graph illustrating the characteristics of a display light after the laser light from the light source device 10 passes through the color filter 39. A light in an area where the intensity of the laser light from the light source device 10 and the characteristics of the color filter 39 overlap each other is the display light of the liquid crystal panel 30. Since a laser light is used as a light source in the present embodiment, as described above, image display with high color purity can be realized.

[1-5] Modification

Figure 8:
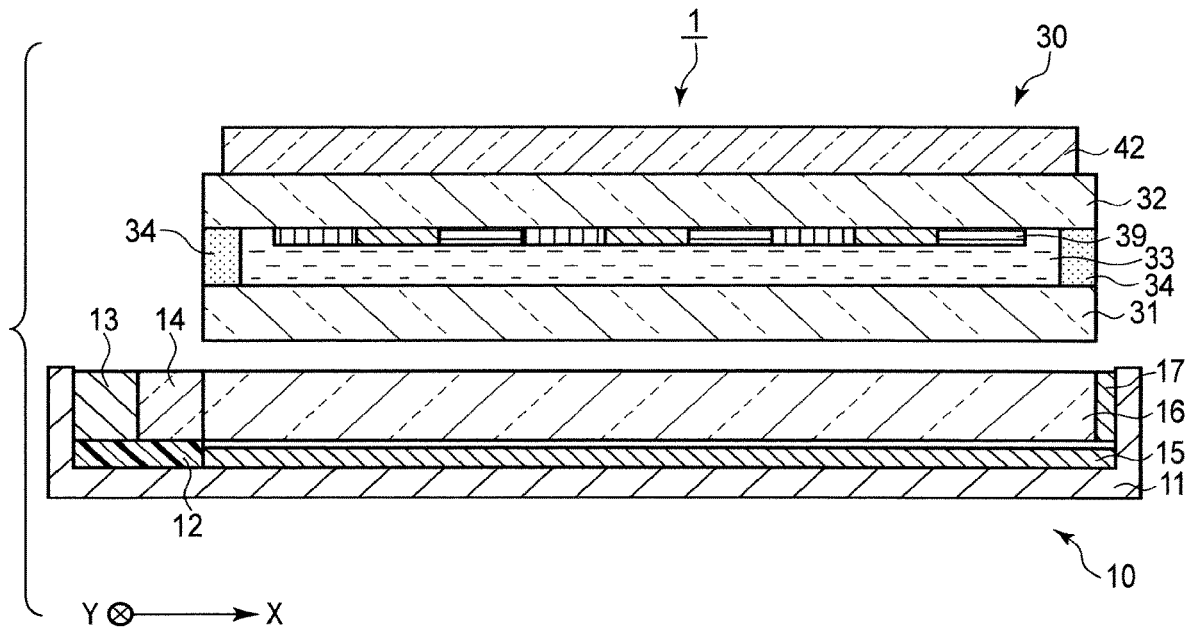
FIG. 8 is a cross-sectional view of a liquid crystal display apparatus according to a modification of the first embodiment.

FIG. 8 is a cross-sectional view of the liquid crystal display apparatus 1 according to a modification of the first embodiment. A reflecting film 17 may be provided on a side portion (side surface) of the light guide plate 16 far from the light-emitting element 13.

The reflecting film 17 reflects a light emitted from the side surface of the light guide plate 16 that is in contact with the reflecting film 17 into the light guide plate 16 again. As a result, the usability of the laser light can be improved.

[1-6] Advantageous Effects of First Embodiment

In the first embodiment, the liquid crystal display apparatus 1 includes the light source device 10 that provides a laser light to the liquid crystal panel 30, as detailed above. The light source device 10 includes the light-emitting element 13 that emits a laser light, and the light guide plate 16 that is arranged to receive the laser light from the light-emitting element 13 at its side portion and has a stepped bottom portion. The bottom portion of the light guide plate 16 has the plurality of reflecting surfaces 16B arranged side by side in the first direction in which the laser light travels, and each of the reflecting surfaces 16B is inclined in the first direction with respect to a perpendicular direction of an upper surface of the light guide plate 16.

Therefore, according to the first embodiment, the color purity can be improved and the light intensity can be improved, as compared to the case where a white LED is used as a light source. High color reproducibility can also be realized by using a laser as a light source.

In addition, the light source device 10 includes the optical system 14 (the rod lens 14A and the cylindrical lens 14B) that converts the laser light from the light-emitting element 13 into a parallel light. Thereby, the light source device 10 can function as a surface light source.

The light source device 10 can also generate a linearly polarized light in a predetermined direction. Therefore, the liquid crystal panel 30 need not have a polarizing plate on the light source device 10 side. As a result, it is possible to suppress a decrease of the light intensity due to a polarizing plate, and therefore possible to suppress a decrease of the light intensity of an image displayed by the liquid crystal display apparatus 1.

Since the number of polarizing plates can be reduced, the manufacturing costs can be reduced. Also, there is no need for a diffusion sheet that diffuses a light for the backlight.

[2] Second Embodiment

Figure 9:
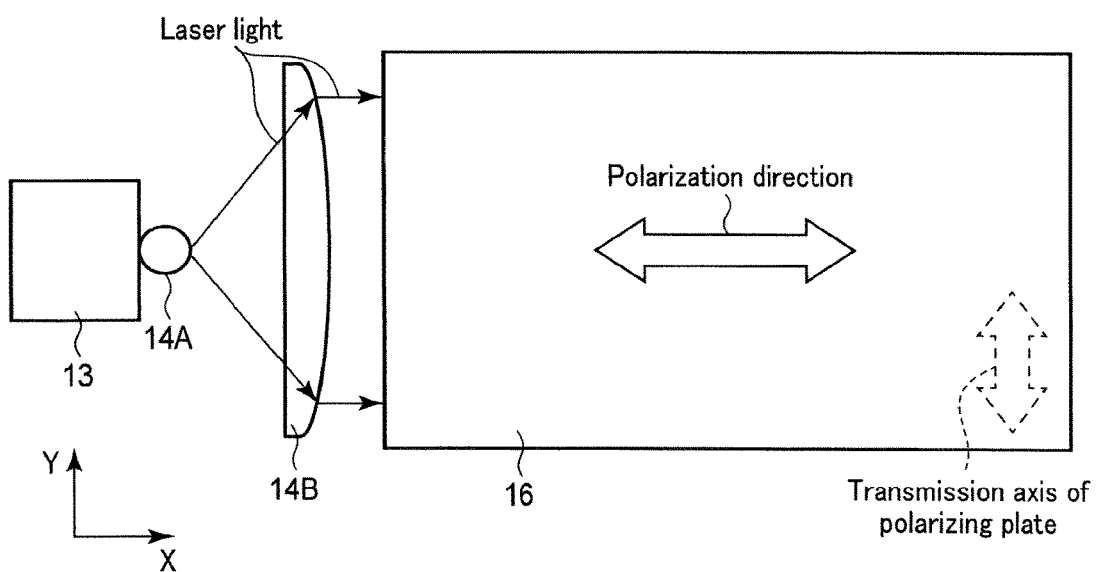
FIG. 9 is a plan view of a light source device according to a second embodiment.
Figure 10:
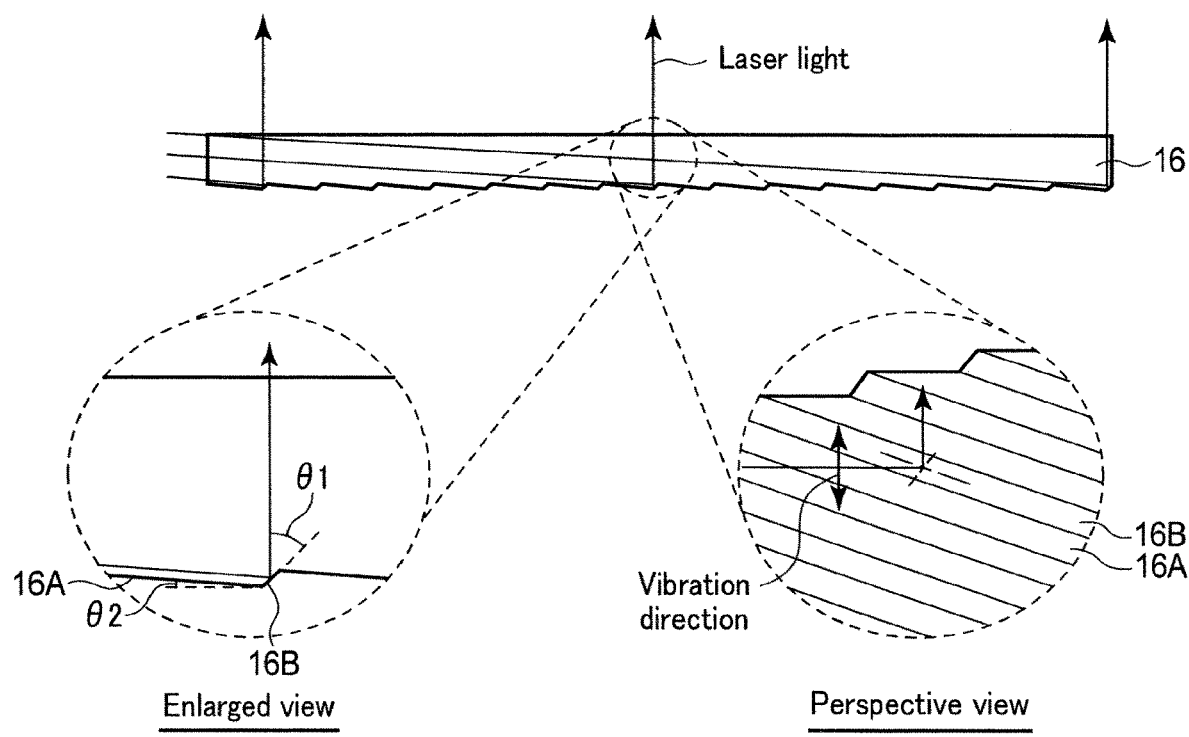
FIG. 10 is a cross-sectional view of a light guide plate according to the second embodiment.

A second embodiment is a configuration example of the light source device 10 having a polarization direction different from that of the first embodiment. FIG. 9 is a plan view of the light source device 10 according to the second embodiment. FIG. 10 is a cross-sectional view of the light guide plate 16 according to the second embodiment.

As shown in FIGS. 9 and 10, the light-emitting element 13 emits a laser light that vibrates in a direction approximately perpendicular to the XY plane and has high directivity. The light guide plate 16 reflects, to the liquid crystal panel 30 side, the laser light incident from the light-emitting element 13 via the optical system 14. As a result, the laser light from the light source device 10 becomes a surface light source and has a polarization direction in the X direction.

The polarizing plate 42 of the liquid crystal panel 30 is configured so that its transmission axis is in the Y direction. The polarization direction of the laser light from the light guide plate 16 is approximately orthogonal to the transmission axis of the polarizing plate 42. Therefore, the display of normally black is realized according to the light modulation by the liquid crystal layer 33. As a result, the liquid crystal panel 30 can display a desired image.

As described above, in the second embodiment, the polarization directions of the light source device 10 and the liquid crystal panel 30 can be set to directions different from those of the first embodiment.

[3] Third Embodiment

Figure 11:
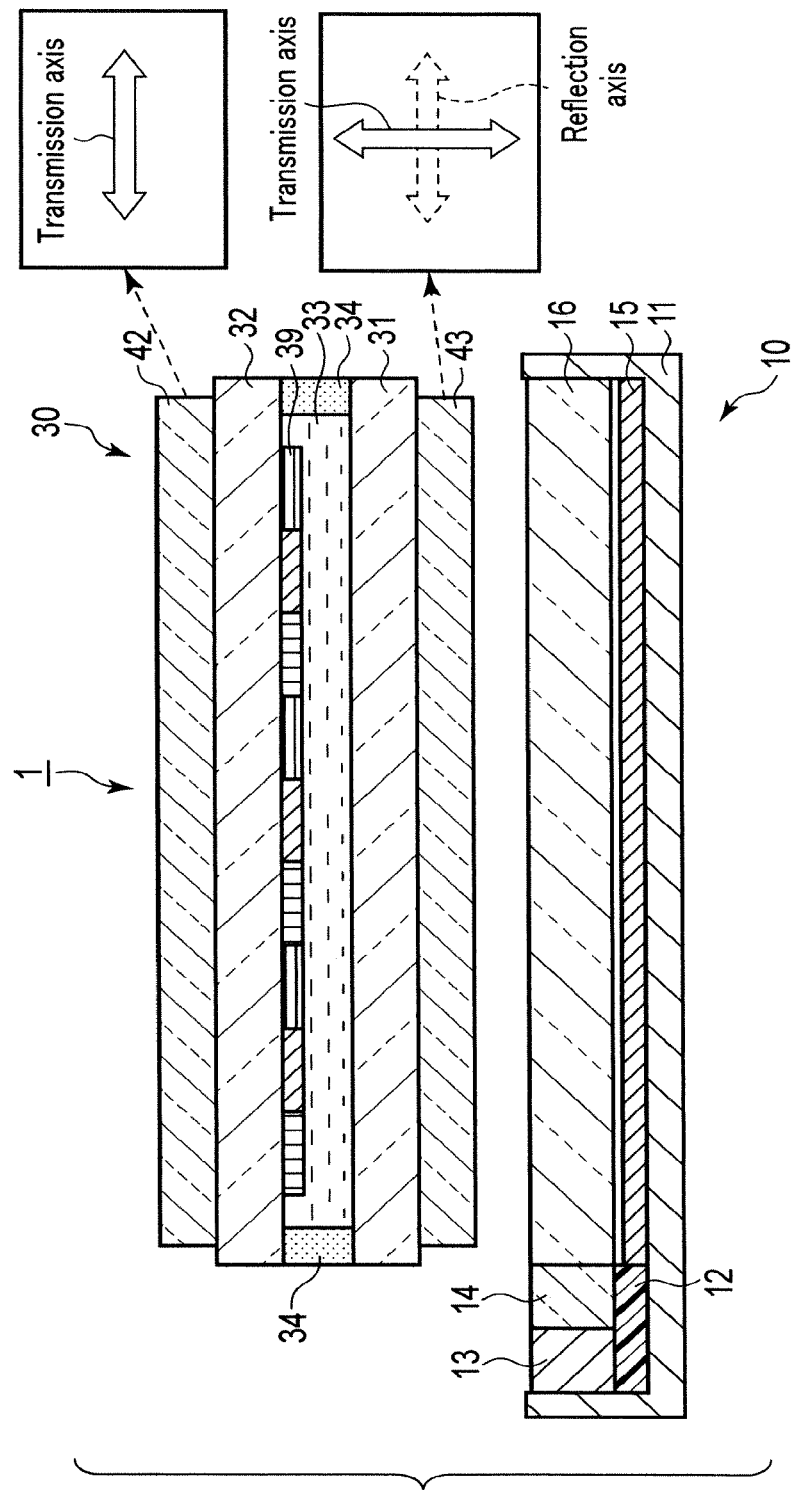
FIG. 11 is a cross-sectional view of a liquid crystal display apparatus according to a third embodiment.

FIG. 11 is a cross-sectional view of the liquid crystal display apparatus 1 according to a third embodiment. A reflective polarizing plate (reflective polarizer) 43 is provided on a side of the TFT substrate 31 opposite to the liquid crystal layer 33. FIG. 11 additionally shows transmission axes of the polarizing plate 42 and the reflective polarizing plate 43 as viewed along the plane from above. The configuration other than the reflective polarizing plate 43 is the same as that of the first embodiment.

The reflective polarizing plate 43 has a transmission axis and a reflection axis that are orthogonal to each other in a plane orthogonal to a traveling direction of light. Among lights having a vibration plane in a random direction, the reflective polarizing plate 43 transmits a linearly polarized light (linearly polarized light component) having a vibration plane parallel to the transmission axis, and reflects a linearly polarized light (linearly polarized light component) having a vibration plane parallel to the reflection axis. The transmission axis of the reflective polarizing plate 43 is parallel to the polarization direction of the light source device 10 and is orthogonal to the transmission axis of the polarizing plate 42.

The linearly polarized light from the light source device 10 passes through the reflective polarizing plate 43 to be incident on the liquid crystal layer 33. Thereby, a sufficiently polarized laser light can be obtained. For example, if polarization is insufficient only with the light source device 10, a more desirable linearly polarized light can be obtained by using the reflective polarizing plate 43.

In addition, a laser light reflected by the reflective polarizing plate 43 is reflected by the reflecting sheet 15 of the light source device 10 and reused. As a result, the usability of the laser light can be improved.

The reflective polarizing plate 43 of the third embodiment may be applied to the second embodiment. In this case, the transmission axis of the reflective polarizing plate 43 is set parallel to the polarization direction of the light source device 10.

[4] Fourth Embodiment

A fourth embodiment is another configuration example of the light source device 10, wherein a Fresnel reflection in the light guide plate is utilized to generate a surface light source of a laser light.

FIG. 12 is a plan view of the light source device 10 according to the fourth embodiment. FIG. 13 is a cross-sectional view of the light guide plate 16 according to the fourth embodiment. Unlike the first embodiment, the light-emitting element 13 emits a laser light in the horizontal direction. Therefore, the laser light from the light-emitting element 13 is perpendicularly incident on the side surface of the light guide plate 16.

The light guide plate 16 has a light-diffusing portion 16C on its side surface closer to the light-emitting element 13. The light-diffusing portion 16C is a lens in a shape of a semicircular column extending in the direction perpendicular to the XY plane. The light-diffusing portion 16C is disposed on an optical path of the laser light from the light-emitting element 13, and is disposed so as to receive the laser light on its curved surface. The light-diffusing portion 16C is set to have a short focal length, and diffuses a laser light at a predetermined radiation angle (spread angle). The radiation angle of the laser light diffused by the light-diffusing portion 16C can be suitably set by suitably setting the radius and the refractive index of the light-diffusing portion 16C. The rod lens 14A shown in the first embodiment may be used instead of the light-diffusing portion 16C.

The light guide plate 16 includes a Fresnel lens 16D on its side surface opposite to the light-diffusing portion 16C. The Fresnel lens 16D functions to convert the laser light diffused by the light-diffusing portion 16C into a parallel light. A reflecting film 50 is provided on a side surface of the Fresnel lens 16D. The reflecting film 50 again reflects, into the light guide plate 16, the laser light transmitted through the light guide plate 16.

The side surface of the Fresnel lens 16D is inclined downward at an angle $\theta 2$. As a result, the Fresnel lens 16D and the reflecting film 50 can reflect the laser light incident horizontally on the Fresnel lens 16D downward at the angle $\theta 2$.

A bottom portion of the light guide plate 16 is formed in a staircase manner and has a plurality of steps. Each step is formed of a step surface 16A and a reflecting surface 16B that intersects the step surface 16A. A plurality of reflecting surfaces 16B are arranged side by side in the X direction, and each of the plurality of reflecting surfaces 16B extends in the Y direction. The reflecting surfaces 16B each reflect the laser light from the Fresnel lens 16D toward the liquid crystal panel 30. Each of the reflecting surfaces 16B is inclined at an angle $\theta 1$ with respect to the vertical direction. Each of the step surfaces 16A is inclined at an angle $\theta 2$ with respect to the horizontal direction. The inclination of the step of the light guide plate 16 in the fourth embodiment is opposite to that in the first embodiment. Thereby, the laser light from the Fresnel lens 16D can be efficiently incident on the plurality of reflecting surfaces 16B.

As in the first embodiment, the reflecting sheet 15 is provided below the light guide plate 16.

(Operation)

Next, an operation of the liquid crystal display apparatus 1 having the above-described configuration will be described.

As shown in FIGS. 12 and 13, the light-emitting element 13 emits a laser light that vibrates in the horizontal direction (Y direction) and has high directivity. The laser light from the light-emitting element 13 is diffused by the light-diffusing portion 16C so as to have a predetermined radiation angle. The laser light from the light-diffusing portion 16C is converted into a parallel light by the Fresnel lens 16D. The parallel light is reflected by the reflecting film 50 and passes through the light guide plate 16 again. Also, the Fresnel lens 16D and the reflecting film 50 reflect the laser light from the light-diffusing portion 16C downward at an angle $\theta 2$ with respect to the horizontal direction.

Subsequently, the laser light in the light guide plate 16 is reflected upward by the plurality of reflecting surfaces 16B formed at the bottom portion of the light guide plate 16. Also, since the vibration direction of the laser light in the light guide plate 16 is approximately parallel to the plurality of step surfaces 16A formed at the bottom portion of the light guide plate 16, the laser light is efficiently incident on the plurality of reflecting surfaces 16B and is reflected.

In addition, the reflecting sheet 15 is provided below the light guide plate 16, as in the first embodiment. Therefore, the laser light transmitted and diffused below the light guide plate 16 is reflected by the reflecting sheet 15, and is incident on the light guide plate 16 again. As a result, the usability of the laser light can be improved.

The laser light from the light source device 10 becomes a surface light source and has a polarization direction in the Y direction. The laser light from the light source device 10 is incident on the liquid crystal panel 30. As a result, the liquid crystal panel 30 can display a desired image.

Therefore, the fourth embodiment can achieve advantageous effects similar to those achieved by the first embodiment. Also, the size of the light source device 10 in the X direction can be reduced, as compared to that of the first embodiment. The second and third embodiments can be applied to the fourth embodiment.

In the first to fourth embodiments, a liquid crystal panel is described as an example of a display panel. The display panel is not limited to a liquid crystal panel. Various display panels can be used that need a backlight, and can be optically modulated using a light received from the backlight.

In the present specification, "parallel" is preferably perfectly parallel, but does not necessarily have to be strictly parallel. "Parallel" may include those that can be regarded as practically parallel in view of the effect of the present invention, and may include errors that may occur in the manufacturing process. Also, "vertical" or "perpendicular" do not necessarily have to be strictly vertical or perpendicular, but may include those that can be regarded as practically vertical or perpendicular in view of the effect of the present invention, and may include errors that may occur in the manufacturing process.

In the present specification, the expressions "sheet," "plate," "film," etc., represent the members, and they are not limited to the configurations thereof. For example, the polarizing plate is not limited to a plate-shaped member, but may be a film or another member having the function described in the specification.

The present invention is not limited to the above-mentioned embodiments, and can be reduced to practice by modifying the constituent elements without departing from the spirit and scope of the invention. In addition, the above-described embodiments include inventions of various stages, and a variety of inventions can be derived by properly combining structural elements of one embodiment or by properly combining structural elements of different embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. A light source device for supplying a laser light to a display panel, the light source device comprising:
a light-emitting element configured to emit a laser light;
a light guide plate disposed to receive the laser light from the light-emitting element at a first side portion, the light guide plate including a stepped bottom portion and a second side portion that is disposed on a side opposite to the first side portion and made of a Fresnel lens; and
a reflecting film covering the Fresnel lens,
wherein the stepped bottom portion of the light guide plate includes a plurality of reflecting surfaces arranged side by side in a first direction in which the laser light travels,
the second side portion of the light guide plate is inclined in a second direction opposite to the first direction with respect to a perpendicular direction of an upper surface of the light guide plate,
the reflecting film reflects the laser light transmitted through the light guide plate diagonally downward to the stepped bottom portion of the light guide plate, and the stepped bottom portion of the light guide plate reflects the laser light reflected by the reflecting film toward the display panel.

2. The light source device according to claim 1, wherein the light-emitting element emits a red laser light, a green laser light, and a blue laser light.

3. The light source device according to claim 1, wherein each of the reflecting surfaces is inclined in the second direction opposite to the first direction with respect to the perpendicular direction of the upper surface of the light guide plate.

4. The light source device according to claim 1, further comprising a diffusing portion provided on the first side portion of the light guide plate and diffusing the laser light from the light-emitting element.

5. The light source device according to claim 1, further comprising a reflecting film facing the stepped bottom portion of the light guide plate.

6. The light source device according to claim 1, wherein the laser light vibrates in the first direction or in a third direction crossing the first direction.

7. A display apparatus comprising:
the light source device according to claim 1; and
a display panel configured to modulate a parallel light from the light source device.

8. The display apparatus according to claim 7, further comprising a polarizing plate provided on a side of the display panel opposite to the light source device.

9. The display apparatus according to claim 7, further comprising a reflective polarizing plate with a transmission axis and a reflection axis intersecting each other, the reflective polarizing plate provided on a side of the display panel facing the light source device,
wherein the transmission axis of the reflective polarizing plate is substantially parallel to a polarization direction of the light source device.

* * * * *